(12) United States Patent
Nakano

(10) Patent No.: US 6,382,848 B1
(45) Date of Patent: May 7, 2002

(54) SHUTTER FOR CAMERA

(75) Inventor: Yoichi Nakano, Narashino (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/539,139

(22) Filed: Mar. 30, 2000

(30) Foreign Application Priority Data

Mar. 31, 1999 (JP) .......................................... 11-092938
Apr. 20, 1999 (JP) .......................................... 11-111796

(51) Int. Cl.[7] .............................................. G03B 9/08
(52) U.S. Cl. ..................... 396/464; 396/469; 396/470; 396/478
(58) Field of Search ................................. 396/464, 478, 396/469, 493, 463, 470, 452, 455, 457

(56) References Cited

U.S. PATENT DOCUMENTS

| 4,390,262 A | * | 6/1983 | Hirohata et al. | ............ 396/449 |
| 4,415,252 A | * | 11/1983 | Hirohata et al. | ............ 396/464 |
| 4,487,493 A | * | 12/1984 | Ikari et al. | ................... 396/464 |
| 4,504,132 A | * | 3/1985 | Martin et al. | ................ 396/132 |
| 4,779,114 A | * | 10/1988 | Kobayashi | ................... 396/132 |

* cited by examiner

Primary Examiner—David M. Gray
(74) Attorney, Agent, or Firm—Adams & Wilks

(57) ABSTRACT

A shutter for a camera having a small size is driven by coil patterns formed in a spiral shape on at least one of a fixed printed board and a movable printed board. On faces of a shutter base plate and a sector ring opposed to each other, a cam mechanism for making the sector ring progress and regress in an optical axis direction is provided. The cam mechanism comprises end face cams arranged in a concentric shape and cam followers corresponding thereto to facilitate pivoting of the sector ring in closing the shutter by moving the cam followers along downwardly inclined faces of the cams.

20 Claims, 8 Drawing Sheets

(a)

(b)

(c)

(a)

(b)

(a)

(b)

SHUTTER FOR CAMERA

BACKGROUND OF THE INVENTION

1. Field of the Invention

The present invention relates to a shutter for a camera.

2. Description of the Related Art

Although a shutter for a camera is available in various styles and types, as one type there is a shutter for a camera provided such that an aperture of a lens is closed in a state in which a plurality of sheets of sectors are closed and a hole for exposure is opened at a central portion thereof by pivoting the sectors. According to opening and closing operation of the sectors, a base portion of each of the sectors is pivotably supported, a drive pin of a sector drive lever is engaged with a drive hole portion provided at a position apart from the support point by a predetermined distance and the sector can be opened by pivoting the lever and can return to an original position by spring force.

FIG. 8 shows the principle of a shutter drive apparatus for operating a shutter to open and close two sheets of sectors according to a conventional technology and a description of the shutter drive apparatus is as follows. Two sheets of sectors 83 are attached between a shutter base plate 81 and a rear plate 82 to thereby enable to open and close lens apertures 81a and 82a. The shutter base plate 81 and the rear plate 82 can be fixed to be apart from each other at an interval capable of installing the sectors pivotably by screws 84, Respective elements of the shutter drive apparatus are provided on a front face (upper face of FIG. 8) of the shutter base plate 81.

First, a sector drive lever 85 formed with projected portions on both sides of a plate-like member formed substantially in a heart-like shape, is provided at a vicinity of a central portion of the upper face of the shutter base plate 81. According to the sector drive lever 85, a bearing portion 85a provided to project at a pivotal center portion thereof is fitted to a support shaft portion 81b provided to project from the upper face of the shutter base plate 81. A sector drive pin 85b is provided to hang down from a vicinity of a top portion of a lower face of the sector drive lever 85 and the pin passes through an arc groove portion 81c formed in the shutter base plate and is engaged with an oval groove portion 83a of the sector. Further, respective sectors constituting the sector 83 are pivotably supported by pivotal center holes 83b and support pins 81d provided to project from a rear face of the shutter base plate. The respective support pins 81d stably support respectively the sector 83 by being engaged with through holes 82b provided at the rear plate 82.

The sector drive lever 85 is biased in the counterclockwise direction by a spring 86, thereby, the sector 83 is biased in a direction of closing the shutter 83. A drive coil 87 constituted by winding a coil in a spiral shape and solidifying the coil in a doughnut-like shape, is fixedly attached to a rear face of an ear portion 85c formed on a side of the sector drive lever 85 opposed to a position attached with the spring 86. One lead wire 87a of the coil 87 is connected to an outer peripheral portion of the coil and other lead wire 87b is connected to an inner peripheral portion thereof. When electricity is conducted from a drive circuit 88 to the coil 87, there is produced magnetic flux an upper side of which constitutes an S pole and a lower side of which constitutes an N pole, for example. Conduction of electricity to the coil 87 can be controlled by the drive circuit 88 to thereby enable to arbitrarily open and close the shutter.

The drive coil 87 is also pivoted centering on the support shaft portion 81b by pivoting the sector drive lever 85 and a pair of permanent magnets 89 and 90 in a shape of a thin plate are provided on a pivotal locus of the center of the coil. These permanent magnets are fixedly attached onto the upper face of the shutter base plate 81 and the one magnet 89 is disposed on a forward side of the pivotal locus of the coil 87 in the clockwise direction at an initial position and is pasted such that an upper face thereof constitutes an N pole. In contrast thereto, the other permanent magnet 90 is disposed on a rearward side of the pivotal locus of the coil 87 and is pasted such that an upper face thereof constitutes an S pole.

Since the constitution is constructed in this way, when magnetic force with the S pole on a downward side is produced in the coil by conducting controlled electricity from the drive circuit 88 to the coil 87, by the operation of the magnetic force, a suction force is operated between the drive coil 87 and the magnet 89 on the front side and a repulsion force is operated between the drive coil 87 and the magnet 90 on the rear side to thereby move the drive coil 87 in the clockwise direction and pivot the sector drive lever.85 in the same direction. Thereby, the sector 83 is opened and an exposable state is brought about. Next, when electricity is made to stop conducting to the drive coil 87, the magnetic force is extinguished, the sector drive lever 85 returns to the original position by the spring 86 and the shutter is closed.

According to the shutter drive apparatus of the conventional example, the sector drive lever 85 and the drive coil 87 are disposed on different planes and accordingly, there poses a problem in which areas on the planes become large. Further, in addition thereto, the sector drive lever 85, the drive coil 87 and the permanent magnets 89 and 90 are provided at respectively different heights and accordingly, there poses a problem in which a thickness of the shutter becomes large by that amount. Further, the sector drive lever 85 is pivoted by pivoting the drive coil 87 per se and accordingly, there poses a problem in which large kinetic energy is needed and accordingly, power consumption is increased.

SUMMARY OF THE INVENTION

A supporting plate having an opening is integrated with magnetic field generating elements in the form of a fixed printed board having a plurality of coil patterns substantially disposed in a concentric shape relative to a center of an optical axis of the opening and a movable printed board opposed to (confronting) one face of the fixed printed board and having magnetic field generating elements in the form of a plurality of coil patterns in a similar manner, the movable printed board is made pivotable by conducting electricity to the respective coil patterns acting as electromagnets and the movable printed board is constituted to be capable of opening and closing a sector to thereby enable to realize thinned formation and downsized formation of the shutter.

Polarities of the two printed boards are made the same in directions in which the two printed boards are opposed to each other, further, initial positions of the movable coil patterns of the movable printed board are set to positions deviated from positions of the fixed coil patterns of the fixed printed board in an advancing direction by a predetermined angle, electromagnetic forces produced from the two coil patterns and produced by conducting electricity from a drive circuit repulse each other and the movable printed board is made pivotable in a direction of opening the sector.

The movable printed board is easily pivoted in the direction of opening the sector by providing a cam mechanism for making the movable printed board progress and regress in a direction of the optical axis on faces of the movable printed board and a shutter base plate opposed to each other.

When the sector is opened to an aperture having a size determined by a diaphragm value, the sector is set to stop driving, at this occasion, when electricity is made to stop conducting to the coil patterns by the drive circuit, the electromagnetic forces of the two printed boards are extinguished and a sector lever returns to an original position by biasing force of a spring to thereby close the shutter.

As an example of the cam mechanism, there is adopted a cam mechanism in which end face cams disposed substantially in a concentric shape relative to the optical axis center are provided at either one of the shutter base plate and the movable printed board and cam followers provided to project from the opposed face are provided at other thereof. The end face cams are formed at inclined faces lowering in a direction of pivoting the movable printed board in a direction of opening the sector to thereby facilitate pivoting of the movable printed board.

Further, in any of the above-described means, according to the respective coil patterns, the respective coil patterns are arranged at the respective printed boards in a connected state on the faces of the respective printed boards opposed to each other or on two faces of each of the printed boards and electromagnetic forces of a number of the coil patterns are utilized to thereby provide large drive force.

In arranging the coil pattern of the printed boards, the movable coil patterns of the movable printed board are disposed at positions deviated from the fixed coil patterns by a predetermined rotational angle in an advancing direction at initial positions. Further, ways of winding spirals of coils in coil patterns of the two boards are made to direct in directions opposed to each other in view from the same direction, torque is operated to the movable printed board by repulsion force and force in the optical axis direction is effected by pressing the movable printed board to thereby help pivot the movable printed board by the cam mechanism.

According to other means, drive force in closing the sector is controlled by the drive circuit such that electricity is conducted to the coil pattern of either of the printed boards to direct in a reverse direction, in addition to the biasing force of the spring to thereby enable to shorten a time period of closing the sector by utilizing suction force produced by making polarities at the opposed faces different from each other.

Further, according to other means, as the coil patterns of the respective printed boards, by arranging spirals in the same way of winding in view from the same direction on both of the printed boards, there can be produced electromagnetic force having an intensity twice as much as that in the case in which the spirals are arranged only on faces of the respective printed boards on one side.

Further, according to other means, permanent magnets are arranged on a rear face of the supporting plate in place of the coil patterns of the fixed printed board to thereby enable pivoting of the movable printed board by magnetic force of the permanent magnets and the electromagnetic force produced by the coil patterns of the movable printed board. Although a thickness of the shutter is increased by a thickness of the permanent magnets, the sector can be opened by large drive force since strong magnetic force is provided.

BRIEF DESCRIPTION OF THE DRAWINGS

FIGS. 3A, 3B and 3C are perspective views showing a way of winding spirals and a positional relationship of coil patterns according to the first embodiment in which FIG. 3A shows a fixed printed board, FIG. 3B shows a movable printed board at an initial position and FIG. 3C shows the movable printed board after having been pivoted;

FIGS. 4A and 4B show operation of the first embodiment in which FIG. 4A is an explanatory view showing a positional relationship at an initial state of the two printed boards and FIG. 4B is an explanatory view showing polarities of respective coil patterns and a positional relationship after having been pivoted;

FIGS. 5A and 5B are characteristic diagrams showing electricity conduction time period and a shutter aperture according to the first embodiment in which FIG. 5A shows a case of one direction electricity conduction and FIG. 5B shows a case of two directions electricity conduction;

DETAILED DESCRIPTION OF THE PREFERRED EMBODIMENTS

A shutter for a camera according to the invention is featured in that electricity is conducted to coil patterns printed on printed boards in place of the conventional shutter drive coil and a sector ring is pivoted by producing electromagnetic forces in directions opposed to each other at positions of opposed faces deviated by a predetermined angle.

The shutter is provided with a fixed printed board fixed to an upper plate constituting a supporting plate provided with an opening and having a plurality of fixed coil patterns disposed substantially in a concentric shape relative to a center of an optical axis of the opening, a movable printed board opposed to one face of the fixed printed board and having a plurality of movable coil patterns disposed in a state in which the plurality of movable coil patterns are deviated from the respective coil patterns of the fixed printed board by a predetermined angle at initial positions, a drive circuit for controlling to conduct electricity to the fixed coil patterns and the movable coil patterns, a sector ring attached in a state in which the sector ring is pivotable integrally with the movable printed board and deviated in one direction by a spring, a cam mechanism capable of progressing and regressing the sector ring in a direction of the optical axis by faces of the sector ring and a shutter base plate supporting thereof opposed to each other and a sector provided openably and closably by pivoting the sector ring.

The cam mechanism is provided at the faces of the shutter base plate and the sector ring opposed to each other and may be constituted by end face cams disposed substantially in a concentric shape relative to a center of the optical axis at either one of the shutter base plate and the sector ring and cam followers provided to project at other thereof.

It is preferable that the respective coil patterns are arranged on faces of the respective printed boards opposed to each other or both faces of the respective printed boards and the respective coil patterns on the respective printed boards are connected to each other.

It is preferable that the drive circuit is set to start conducting electricity to the respective coil patterns in starting to drive the shutter and make electricity conduct to either one of the respective coil patterns in a reverse direction in a time zone of closing the shutter.

Permanent magnets may be arranged on the supporting plate in place of the fixed printed board having the fixed coil patterns to thereby simplify the constitution.

EXAMPLES

An explanation will be given of embodiments according to the invention in reference to the drawings as follows.
(First Embodiment)

Figure 1:
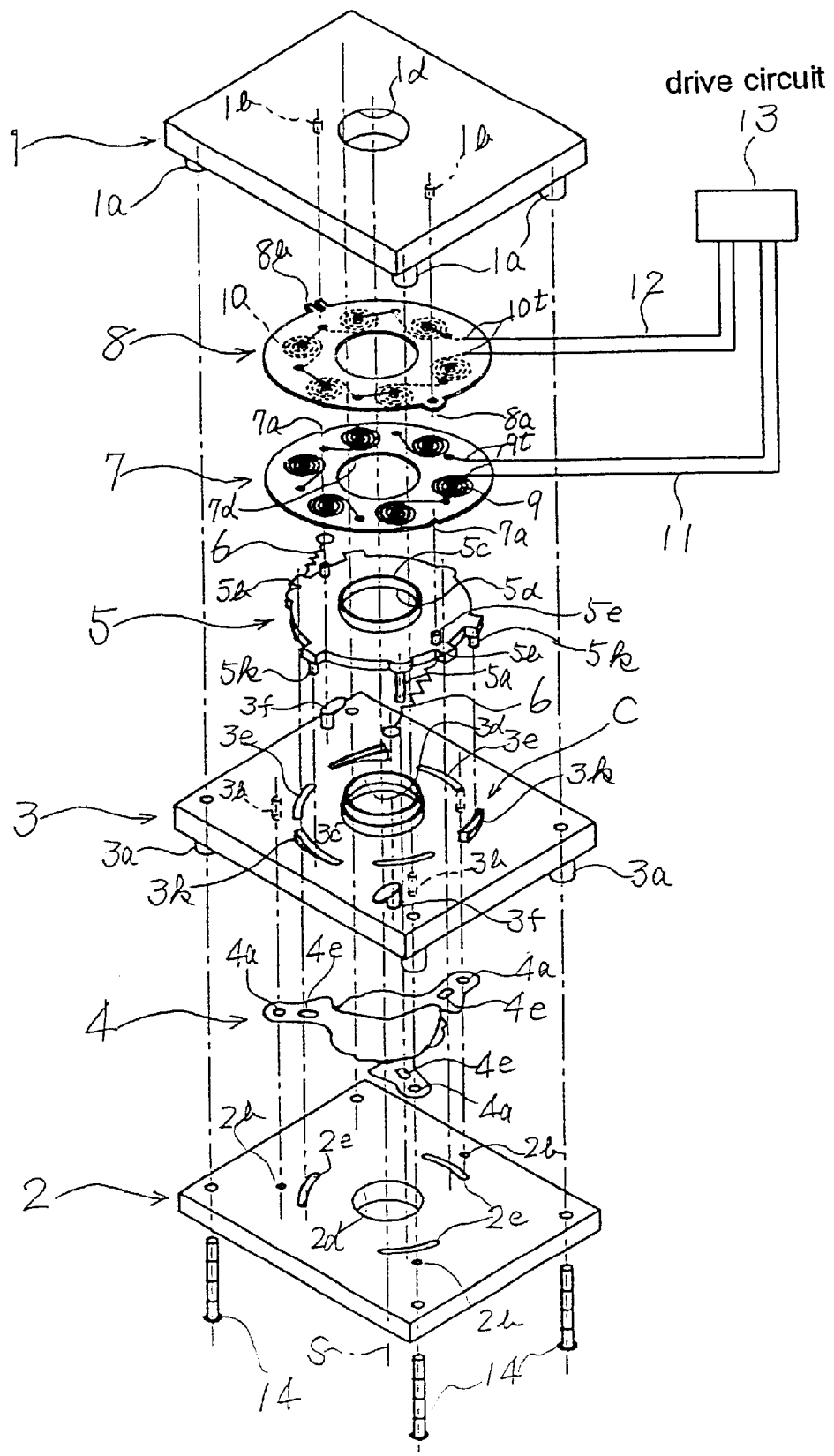
FIG. 1 is a disassembled perspective view of an initial state showing a constitution of a first embodiment.

FIG. 1 shows a state in which sectors are closed with regard to a shutter comprising a basic constitution of the invention as a first embodiment by a disassembled perspective view. Further, in the following explanation, an upper side of a drawing is expressed as "upper". The shutter is constituted by arranging an upper plate 1 constituting a supporting plate having an opening 1d centering on an optical axis S on one side (upper face) arranging a lower plate 2 having a similar opening 2d on other side (lower face) and arranging respective constituent elements between the two plates in a laminated state.

A shutter base plate 3 having a similar opening 3d is interposed between the upper plate 1 and the lower plate 2 and three sheets of sectors 4 are provided between the shutter base plate 3 and the lower plate 2. An interval is provided between the lower plate 2 and the shutter base plate 3 such that the sectors 4 can pivotally be moved by spacers 3a formed on a lower face of the shutter base plate 3. Further, the respective sectors 4 are pivotably supported by penetrating support pins 3b provided to project from the lower face of the shutter base plate 3 through support holes 4a of the respective sectors and inserting the support pin 3b to insert through support hole portions 2b perforated in the lower plate 2.

An upper face of the shutter base plate 3 is formed with a shaft portion 3c extended upward from a surrounding of the opening 3d. An opening 5d of a sector ring 5 in a ring-like shape is pivotably fitted to the shaft portion 3c.

Three pieces of sector drive pins 5a (only one piece thereof is illustrated) are provided to hang down from an outer peripheral portion of a rear face of the sector ring 5 at equal angular intervals. The sector drive pins 5a can be engaged with arc grooves 2e provided at the lower plate 2 by penetrating arc grooves 3e provided at the shutter base plate 3 and oval grooves 4e provided at the respective sectors 4. Accordingly, when the sector ring 5 is reciprocally pivoted in a predetermined angular range, a lens aperture 4d can be opened and closed by pivoting the respective sectors (refer to FIG. 2 as a state of opening the sectors).

Further, projections 5b formed at an outer peripheral portion of the sector ring 5 are attached with other ends of springs 6 as two biasing members supported respectively by pins 3f provided to project from the upper face of the shutter base plate 3 to thereby bias the sectors 4 in the clockwise direction relative to the sector ring 5, as a result, the sector 4 is urged in the closing direction.

An upper face of the sector ring 5 is formed with a receiving portion 5c in a cylindrical shape extended upwardly along the opening 5d and the receiving portion is fitted with an opening 7d of a movable printed board 7 formed in a doughnut-like shape. According to the movable printed board 7, not only the lens opening 7d is fitted to the receiving portion 5c of the sector ring but also notched portions 7a formed at two locations of an outer peripheral portion are engaged with fixing pins 5e provided to project from the upper face of the sector ring to thereby enable to integrally pivot two members of the movable printed board 7 and the sector ring 5.

A fixed printed board 8 is provided on a lower face of the upper plate 1 to be opposed to the movable printed board 7. The fixed printed board 8 is fixed to the upper plate 1 such that the fixed printed board 8 is not rotatable relative to the upper plate 1 by engaging engaging portions 8a and 8b formed at an outer peripheral portion thereof with fixing pins 1b provided to hang down from the lower face of the upper plate 1.

Figure 3:
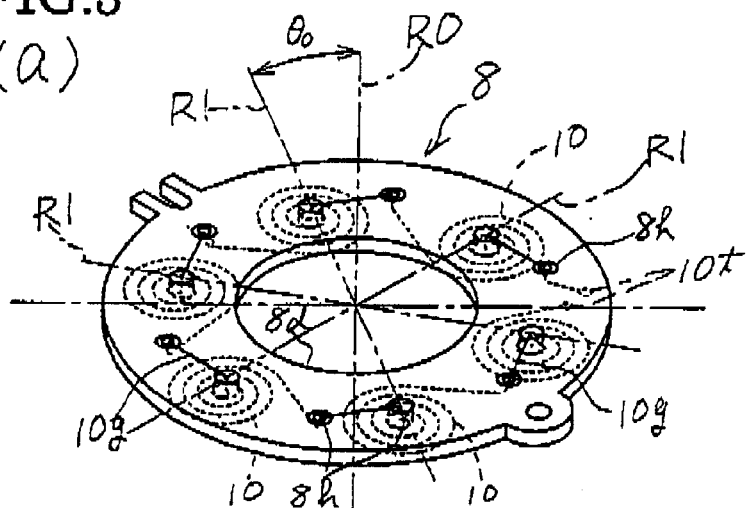
Figure 3:
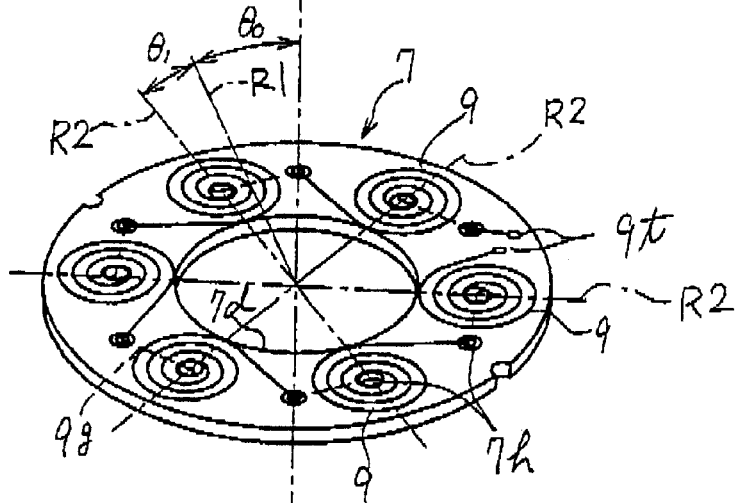
Figure 3:
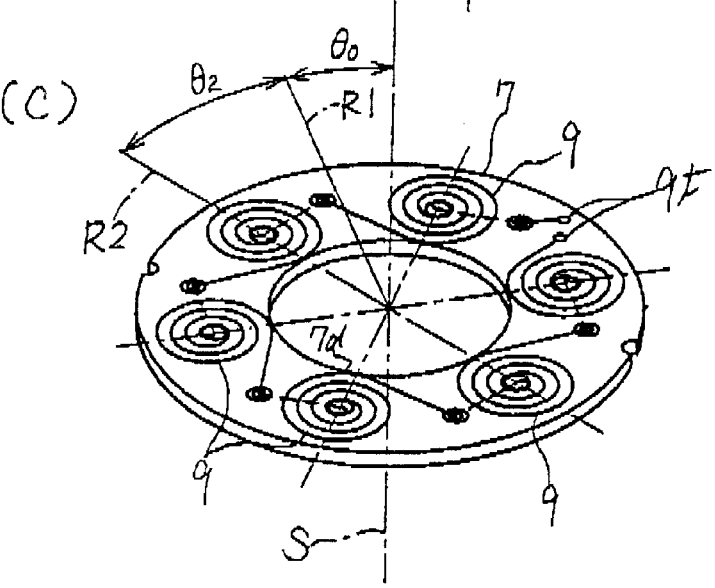

Coil patterns 9 and 10, mentioned later, are formed on an upper face of the movable printed board 7 and a lower face of the fixed printed board 8. Specific terminal portions 9t and 10t of the respective coil patterns are connected to a drive circuit 13 respectively via lead wires 11 and 12 (refer to FIG. 3).

The sector ring 5, the spring 6, the movable printed board 7 and the fixed printed board 8 are disposed in a laminated state within an interval provided between the upper plate 1 and the shutter base plate 3 by spacer portions 1a provided to hang down from four corners of the lower face of the upper plate 1. Further, the shutter is integrated by four screws 14 (only three are illustrated).

There is provided a cam mechanism C capable of progressing and regressing the sector ring in the optical axis direction on faces of the shutter base plate 3 and the sector ring 5 opposed to each other. The cam mechanism C is constituted by combining end face cams 3k provided at three locations on an upper face of the shutter base plate 3 to dispose substantially in a concentric shape relative to the center of the optical axis and cam followers 5k provided in a projected shape at positions of a lower face of the sector ring 5 in correspondence with the end face cams.

The height of an end face of the end face cam 3k is formed by an inclined face gradually lowered in the advancing direction of the sector ring 5. The sector ring 5 is exerted with vertical force directed to the shutter base plate 3 along the optical axis S by repulsion force between the printed boards 7 and 8 when the sector ring 5 is pivoted against biasing force of the springs 6 and the vertical force plays a role of increasing pivoting force of the sector ring 5 by producing a horizontal component of force by pressing the end faces of the end face cams 3k by the cam followers 5k (refer to FIGS. 4A, 4B). Further, the cam mechanism C may be constructed by a constitution in which the end face cams are provided on the lower face of the sector ring 5 and the cam followers are provided on the upper face of the shutter base plate 3.

Figure 2:
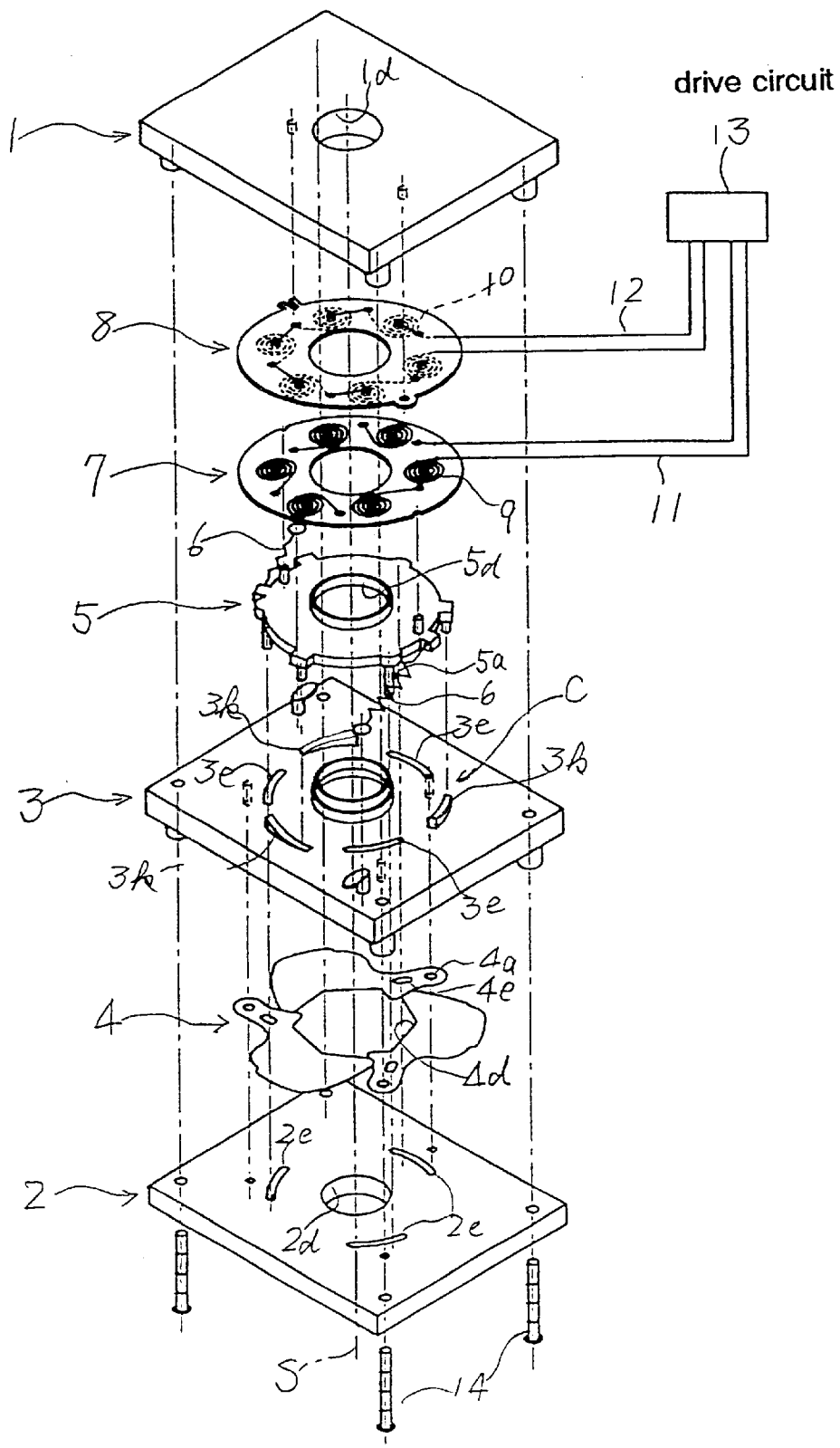
FIG. 2 is a disassembled perspective view showing a state in which a shutter is opened.

FIG. 2 shows a state in which the stutter which is closed in FIG. 1 is fully opened and respective notations stay the same as those in FIG. 1 and accordingly, only principal ones there of are designated. The state shows a state in which current controlled by the drive circuit 13 is flowed to the respective coil patterns 9 and 10 and the movable printed board 7 is pivoted in the counterclockwise direction. In accordance therewith, the sector ring 5 is pivoted integrally with the movable printed board 7 and the respective sectors 4 are pivoted in arrow mark directions via the drive pins 5a to thereby form the shutter aperture 4d the center of which coincides with the optical axis S. At this occasion, the cam followers 5k are brought into contact with portions of the end face cams 3k which are lowered by moving from higher positions to lower positions along the inclined faces of the end face cams 3k. Further, when electricity is made to stop flowing to the respective coil patterns by the drive circuit 13, the movable printed board can be returned to an original position by biasing force of the springs 6.

FIGS. 3A, 3B and 3C illustrate to enlarge constitutions of the movable printed board 7 and the fixed printed board 8 used in the first embodiment and a positional relationship between the both. FIG. 3A shows a state of installing the fixed printed board 8. The lower face of the fixed printed board 8 is arranged with a plurality of the coil patterns 10 in a spiral shape on radial lines R1 extended from the optical axis S, having a predetermined radius and extended from the optical axis S at equal angular intervals. According to the respective fixed coil patterns 10, electricity can be conducted to central portions of the spirals 10a by enabling two faces of the fixed printed board 8 to conduct each other via through holes 8h and connecting portions 10g provided on the face of the fixed printed board 8 which is not opposed to the movable printed board 7.

Further, FIG. 3B shows a state of attaching the movable printed board 7 when the movable printed board 7 is at an initial position and similar to the fixed printed board 8, the upper face of the movable printed board 7 constituted by an insulating plate is arranged with a plurality of the coil patterns 9 in a spiral shape on radial lines R2 having a predetermined radius from the optical axis S and extended from the optical axis at equal angular intervals. In each of the movable coil patterns 9, current flows from an inner end portion (central portion) toward an outer end portion (outer peripheral end). That is, according to a way of winding the spiral, the spiral is directed from the inner end portion to the outer end portion in right hand winding and current flows from the inner end portion to the outer end portion (from inside to outside) in the clockwise directions In connecting to the inner end portion of each of the spirals, the connection can be carried out by providing through holes 7h respectively at a vicinity of each of the spirals and the inner end portion of the printed board and connecting portions 9g provided at one of faces of the through holes and the printed boards which are not opposed to each other.

Further, whereas an angle of the radial line R1 radially extended from the optical axis S constituting one of references of positions of arranging the respective fixed coil patterns 10 of the fixed printed board 8, is $\theta_0$ from a line of dividing left and right R0, the radial line R2 of the movable printed board 7 at the initial position is disposed at an angular position advanced from $\theta_0$ further by $\theta_1$ in the counter clockwise direction. This is for making the movable printed board 7 easily pivotable by exerting repulsion forces of opposed faces of the two boards to each other in a skewed direction when electromagnetic forces having the same polarity are produced at the coil patterns 9 and 10 of the two boards in directions opposed to each other.

In this way, as shown by FIG. 3C, when the movable printed board 7 is pivoted in the counterclockwise direction by magnetic repulsion forces and the radial line R2 advances to a rotational angle of $\theta_2$, a diaphragm position determined by setting a diaphragm of a camera is reached and the movable printed board 7 integrally therewith is stopped. The respective displacement amount of the movable printed board 7 at this occasion is $\theta_2-\theta_1$. In this case, when power supply is stopped by the drive circuit 13, the electromagnetic forces respectively displacing the movable printed board 7 are extinguished, the sector ring 5 or the like returns to an original position by the biasing force (refer to FIGS. 1, 2) of the spring 6 and the shutter is closed.

Figure 4:
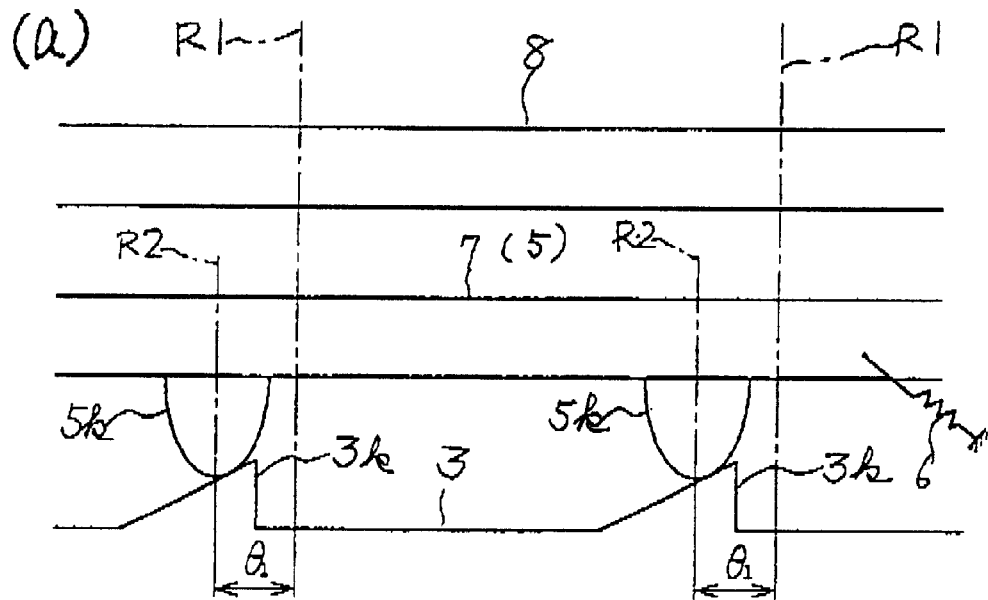
Figure 4:
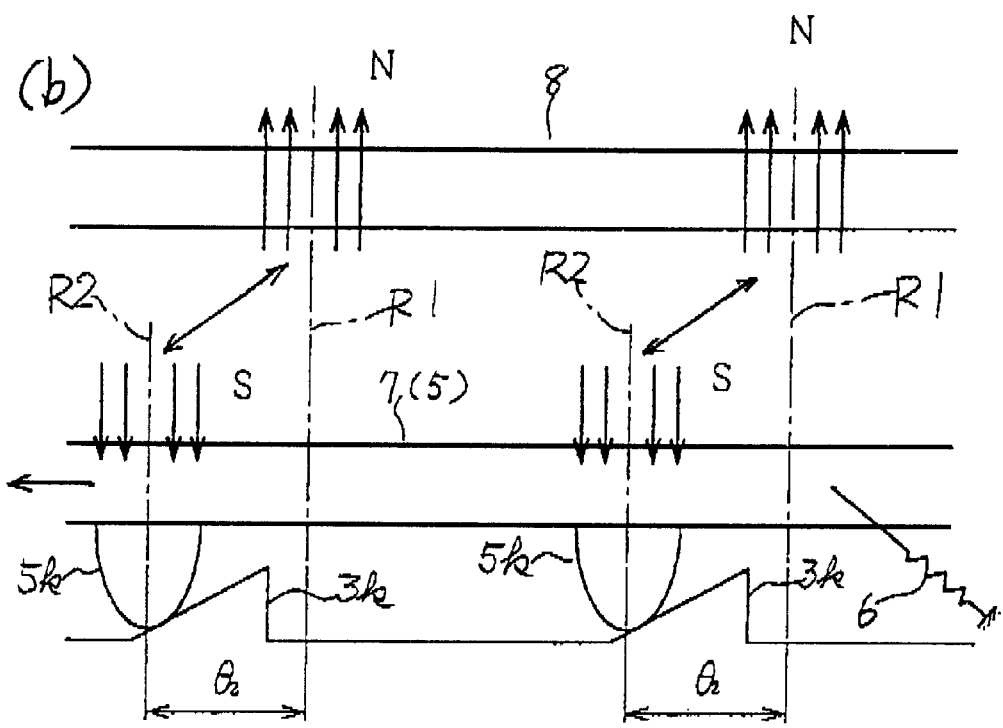

FIGS. 4A and 4B show a relationship between a deviation of the angle ($\theta$) of the radial line between the two printed boards and the drive force. FIG. 4A shows an initial position in which the radial line R2 of the movable printed board 7 is disposed at a position deviated from the radial line R1 of the fixed printed board 8 by the angle $\theta_1$. Under the state, the movable printed board 7 is stationary at the original position by the biasing force of the spring 6.

Further, the cam followers 5k provided at the lower face of the sector ring 5 pivoted integrally with the movable printed board 7, are brought into a state of being brought into contact with portions of higher locations of the inclined faces of the end face cams 3k provided on the shutter base plate 3.

FIG. 4B shows a state in which by conducting electricity to the respective coil patterns 9 and 10 of the two printed boards, electromagnetic force having an N pole on a lower side thereof is produced in the movable printed board 7, electromagnetic force having an N pole on an upper side thereof is produced in the fixed printed board 8 and by repulsion force between the s poles of the opposed faces, the radial line of the movable printed board 7 is pivoted to an angular position constituting $\theta_2$. That is, the movable printed board 7 is displaced by an angle of $\theta_2-\theta_1$. In the angular displacement, a component of force in the optical axis direction produced by repulsion force between the two printed boards, produces a component of force in a direction along the inclined faces of the inclined face cams 3k to thereby facilitate the sector ring 5 to pivot in the advancing direction. The angular displacement is carried out against the biasing force of the spring 6 and accordingly, when the electromagnetic forces are extinguished by stopping to conduct electricity, the movable printed board 7 immediately returns to the initial position by the biasing force and the shutter is closed.

Figure 5:
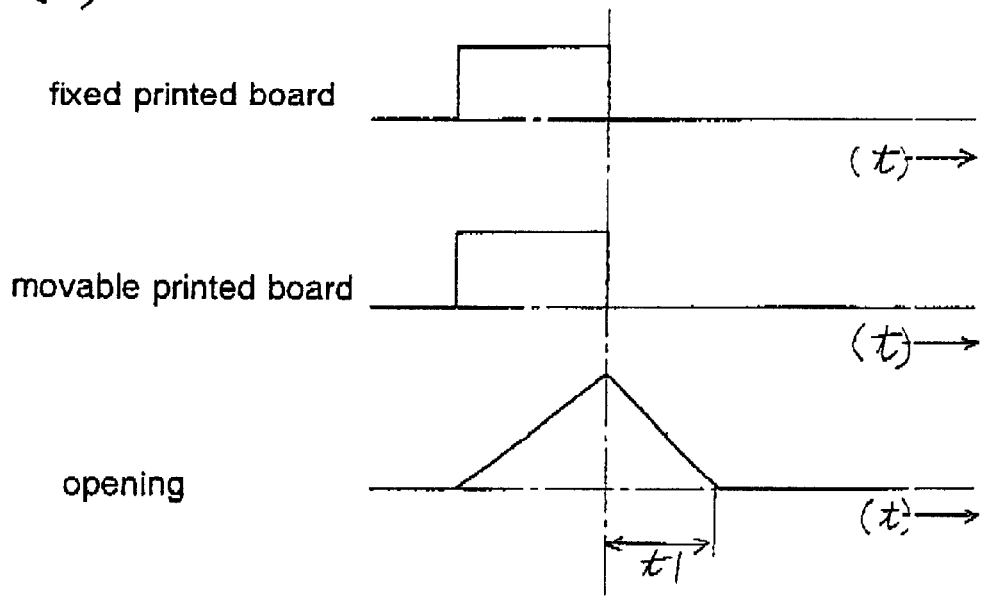
Figure 5:
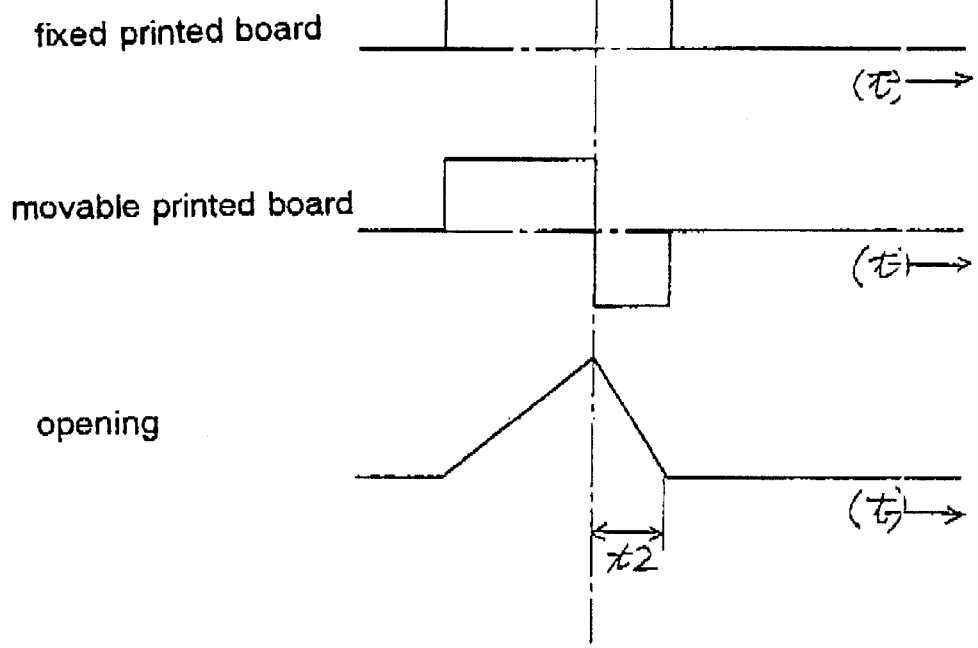

FIGS. 5A and 5B show a relationship between conduction of electricity to the two printed boards and the shutter aperture with regard to time (t). FIG. 5A shows a method of conducting electricity, described above. That is, there is shown a state in which the shutter 4 is opened by conducting electricity to the two coil patterns 9 and 10 of the fixed printed board 8 and the movable printed board 7 and the shutter is closed by the biasing force of the springs 6 by stopping to conduct electricity. That is, the shutter is opened by the electromagnetic forces of the coil patterns and the shutter is closed only by the biasing force of the springs after stopping to conduct electricity.

In contrast thereto, according to FIG. 5B, electricity is conducted to the fixed coil patterns 10 of the fixed printed board 8 during an entire section of fully opening the shutter aperture to closing the shutter aperture, and the shutter is fully opened by conducting electricity to the movable coil patterns 9 of the movable printed board 7 in one direction, thereafter, suction force is exerted to the movable coil patterns by conducting electricity thereto in a reverse direction to thereby exert suction force and operate force to the movable printed board to pivot in the direction of closing the shutter As a result, the shutter can rapidly be closed by adding the suction force to the biasing force of the springs.

Whereas in FIG. 5A, a time period for closing the shutter is t1, the time period for closing the shutter is as short as t2 in FIG. 53 in which the suction force is exerted and there can be constituted a camera having variable shutter speed. Further, the time periods of conducting electricity differ depending on a set value of the shutter diaphragm and FIGS. 5A and 5B are shown to deal with arbitrary diaphragm.

(Second Embodiment)

Figure 6:
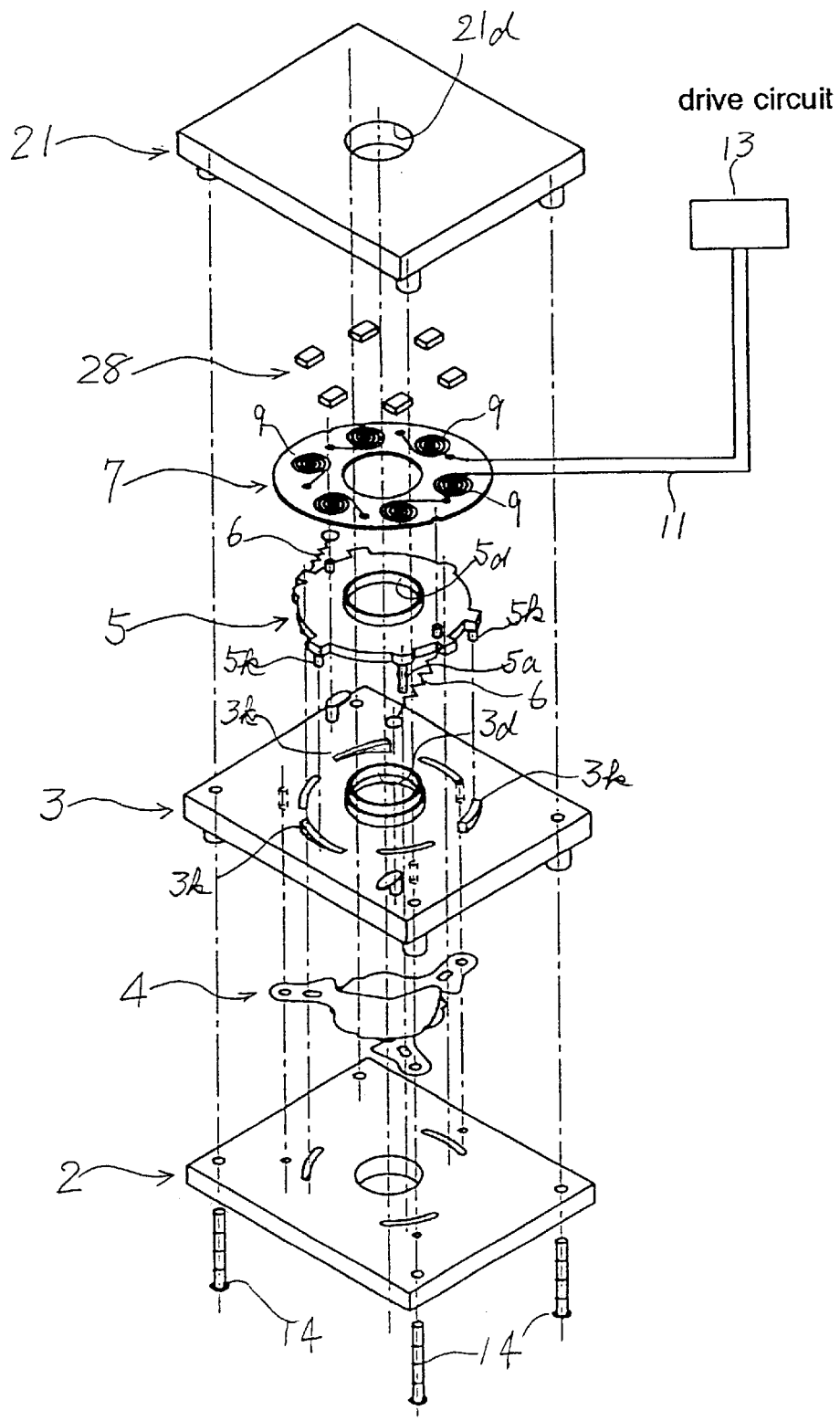
FIG. 6 is a disassembled perspective view showing a constitution of a second embodiment.

According to a second embodiment, as shown by FIG. 6, a shutter is constituted by arranging a plurality of permanent magnets 28 on a lower face of an upper plate 21 in place of the fixed printed board 8 according to the first embodiment. The respective permanent magnets 28 are fixedly attached to the lower face of the upper plate 21 centering on intersecting points of radial lines starting from the optical axis S and a radius of a predetermined length centering on the optical axis. Naturally, intervals of arranging the individual permanent magnets constitute an equal angle similar to the case of FIG. 1. Further, the movable printed board 7 is similar to that in the case of FIG. 1 and with regard to arrangement of the coil patterns 9, similar to the case of the first embodiment, the coil patterns 9 are arranged at angular positions in which the radial lines are deviated from positions of arranging the respective permanent magnets 28 by $\theta_2$ (refer to FIGS. 3A, 3B, 3C, 4A, 4B, 4C). Further, the cam mechanism C is provided on the faces of the shutter base plate 3 and the sector ring 5 opposed to each other similar to the first embodiment.

According to the second embodiment, the constitution including wirings can be simplified since the fixed printed board is not provided as in the first embodiment. Other constitution is the same as that of the first embodiment.

(Third Embodiment)

A third embodiment is constituted by arranging pluralities of coil patterns in a spiral shape in a connected state on both faces of the movable printed board 7 and the fixed printed board 8 according to the first embodiment.

Figure 7:
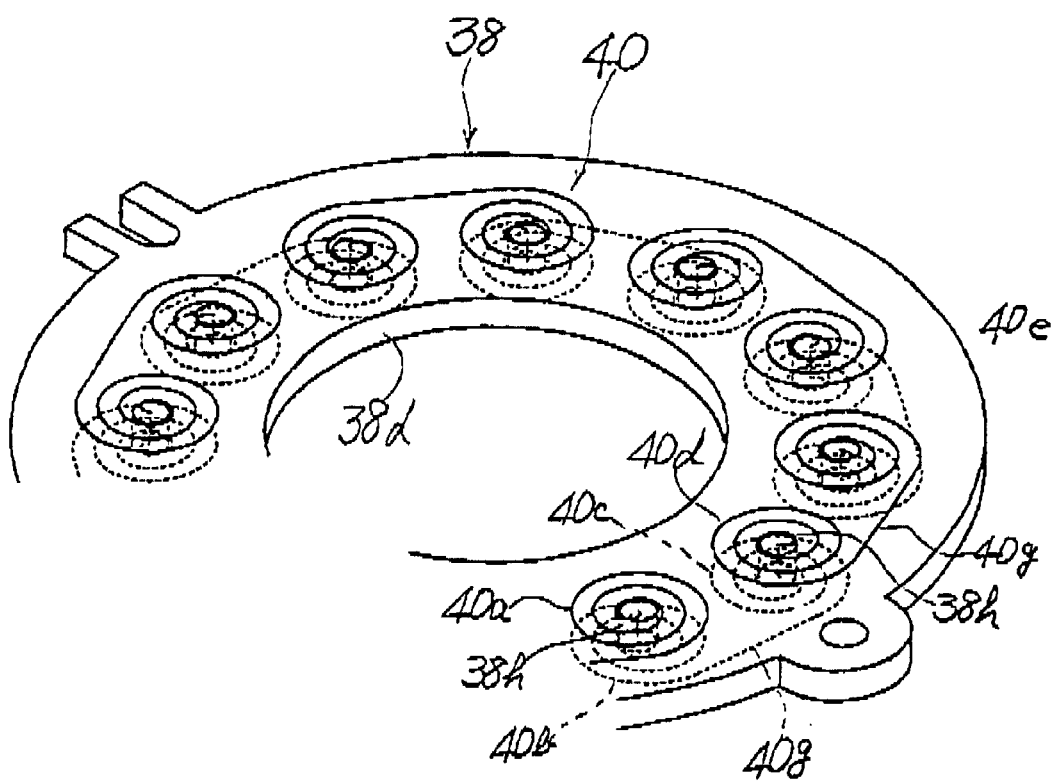
FIG. 7 is a partially-cut perspective view showing coil patterns of a fixed printed board according to a third embodiment.
Figure 8:
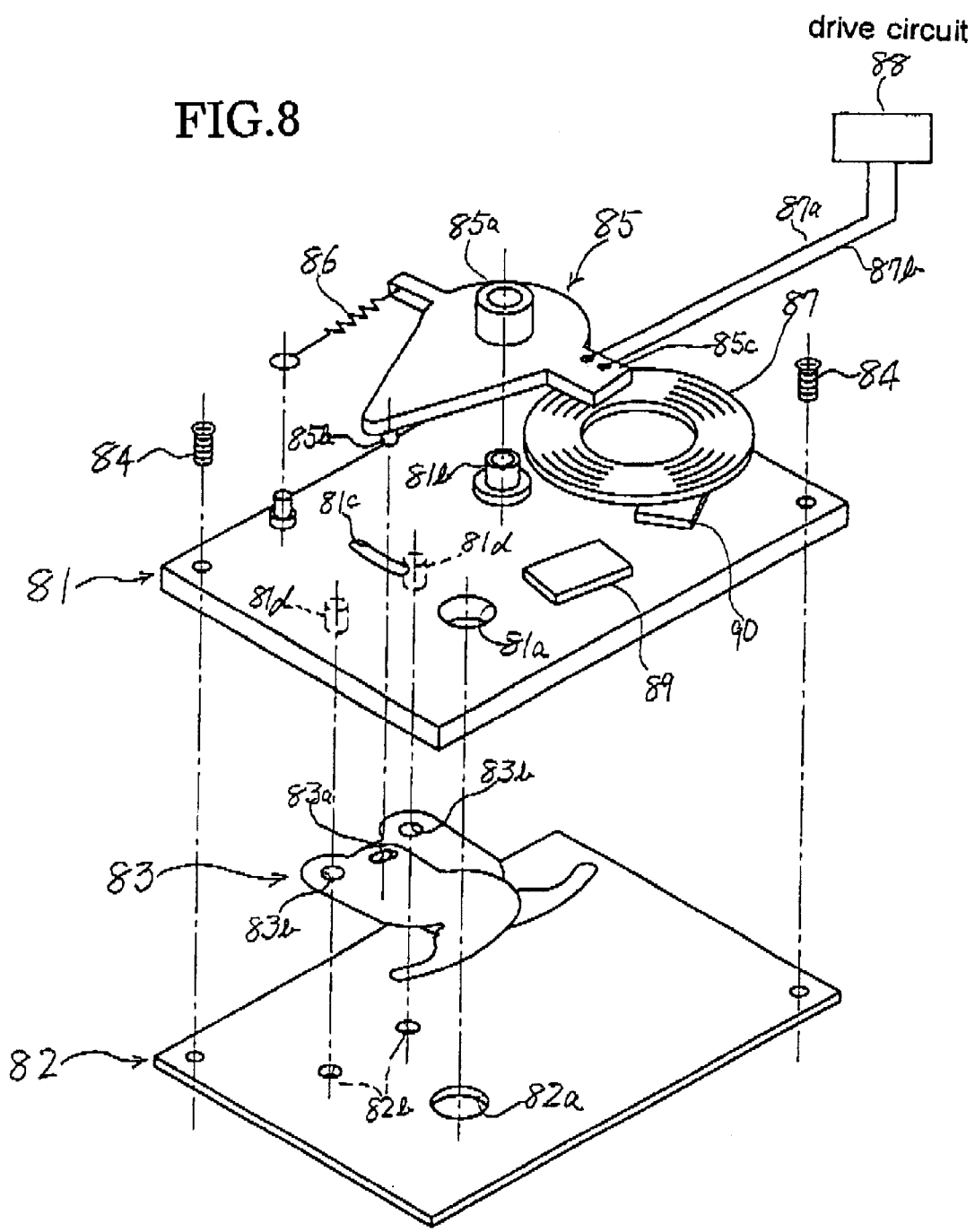
FIG. 8 is a disassembled perspective view showing a constitution of a conventional technology.

FIG. 7 is illustrated to enlarge a fixed printed board 38 according to the third embodiment. As illustrated, two faces of the fixed printed board 38 are respectively provided with pluralities of coil patterns 40 in a spiral shape. All of the coil patterns 40 are constituted such that current flows in the same direction.

For example, according to a spiral 40a disposed on an upper face on the front most side of the drawing, is provided such that the spiral advances in lefthand winding (counterclockwise direction) from outside to inside and an inner end portion thereof is connected to an inner end portion of a coil pattern 40b on a lower face side via a through hole 38h. Further, the spiral 40b on the lower face side constitutes a spiral in righthand winding from inside to outside in view from above. Accordingly, when electricity is conducted to the spirals 40a and 40b of the coil pattern, there are produced electromagnetic forces having a polarity with an N pole on an upper side thereof from both. According to the coil patterns 40, the respective spirals of the two faces are respectively provided to overlap at two faces of the fixed printed board 38 and accordingly, intensities of the electromagnetic forces produced by the both are synthesized to be about twice as much as that in the case of the first embodiment.

Further, an outer end portion of the spiral 40b on the lower face is connected to an outer end portion of a spiral 40c on the lower face disposed at a second position from the front side via a connecting portion 40 on the lower face. The spiral 40c is constituted in righthand winding from outside to inside and is connected to an inner end portion of a spiral 40d at a second position provided on the upper face via the through hole 38h at an inner end portion thereof. The spiral 40d at the second position on the upper face is constituted in righthand winding from inside to outside and an outer end portion thereof is connected to an outer end portion of a third spiral 40e on the upper face via the connecting portion 40g. The spiral 40e is the same as the first coil pattern 40a on the upper face and thereafter, similar spirals are repeatedly provided.

Although not illustrated, spirals having similar coil patterns are provided also on two faces of the movable printed board and the twice electromagnetic forces are similarly produced. Other constitution is the same as that in the first embodiment.

Further, according to the embodiment, a similar effect can be achieved by arranging the permanent magnets on the upper plate as in the second embodiment in place of the fixed printed board.

Although according to any of the first through the third embodiments, a number of installing the coil patterns and a number of the layers are illustrated to be able to determine from the drawings, these numbers can arbitrarily be determined. Further, although an explanation has been given such that a number of the sectors is three, the number can also be determined arbitrarily. Further, although according to the embodiments the movable printed board and the sector ring are provided by separate members, the movable printed board 7 may be provided with the sector driving pins 5a to thereby make the movable printed board 7 serve as the sector ring. Further, the fixed printed board 8 may be provided at the lower plate 2 to thereby constitute the lower plate 2 as a supporting plate and the movable printed board 7 may be provided on the lower face of the sector ring 5. Further, the coil patterns may not be aligned precisely in a circular shape but may be arranged substantially in a circular shape.

According to the invention, the shutter can be downsized and speed of opening and closing the shutter can be accelerated. Further, power consumption can be reduced since the capacity of the movable portion for opening and closing the shutter is reduced. Thereby, a camera having a small size and high function can be provided inexpensively. Further, the cam mechanism is provided between the faces of the shutter base plate and the sector ring opposed to each other and accordingly, pivotal movement of the center ring can be facilitated to thereby reduce power consumption in opening and closing the shutter.

What is claimed is:

1. A shutter for a camera, comprising:
   a supporting plate having an opening therethrough;
   a fixed printed board fixed to the supporting plate and having a plurality of fixed coil patterns disposed substantially in a concentric shape relative to a center of an optical axis of the opening;
   a shutter base plate confronting the supporting plate;
   a movable printed board pivotably supported by the shutter base plate to confront the fixed printed board, the movable printed board having a plurality of coil patterns disposed thereon which, in an initial position of the movable printed board, are deviated from the respective coil patterns formed on the fixed printed board by a predetermined angle;
   a biasing member for biasing the movable printed board so that the coil patterns disposed thereon are deviated at the initial position by the predetermined angle;
   a drive circuit for selectively conducting electricity to the coil patterns on the fixed printed board and the movable printed board to generate an attractive or repulsive magnetic field therebetween to cause the movable printed board to undergo pivotal movement with respect to the fixed printed board;
   a cam mechanism provided on the movable printed board and the shutter base plate to produce a pivotal force applied to the movable printed board in response to a force applied to the movable printed board in a direction of the optical axis; and
   a sector member engaged to undergo pivotal movement with the movable printed board so as to open and close the opening in response to pivoting of the movable printed board.

2. A shutter for a camera according to claim 1; wherein the cam mechanism comprises end face cams disposed substantially in a concentric shape relative to the center of the optical axis on a surface of one of the shutter base plate and the movable printed board, and cam followers projecting from a confronting surface of the other one of the shutter base plate and the movable printed board to engage the end face cams.

3. A shutter for a camera according to any one of claims 1 or 2; wherein each of the printed boards comprises a multilayer printed circuit board having at least two or more faces, the respective coil patterns are arranged on the faces of the respective printed boards facing each other or on at least two faces of each of the printed boards, and the respective coil patterns formed on the respective faces of the printed boards are connected to each other.

4. A shutter for a camera according to any one of claims 1 or 2; wherein the drive circuit conducts electricity to the respective coil patterns in a first direction to open the sector member when starting to drive the shutter and conducts electricity to either one of the respective coil patterns to in a reverse direction to close the sector member when closing the shutter.

5. A shutter for a camera, comprising:
a supporting plate having an opening therethrough;
permanent magnets concentrically arranged on the supporting plate;
a shutter base plate confronting the supporting plate;
a movable printed board pivotably supported by the shutter base plate to confront the permanent magnets, the movable printed board having a plurality of coil patterns disposed thereon which, in an initial position of the movable printed board, are deviated from the permanent magnets by a predetermined angle;
a biasing member for biasing the movable printed board so that the coil patterns disposed thereon are deviated at the initial position by the predetermined angle;
a drive circuit for selectively conducting electricity to the coil patterns on the movable printed board to generate an attractive or repulsive magnetic field therebetween to cause the movable printed board to undergo pivotal movement with respect to the fixed printed board;
a cam mechanism provided on the movable printed board and the shutter base plate to produce a pivotal force applied to the movable printed board in response to a force applied to the movable printed board in a direction of the optical axis; and
a sector member engaged to undergo pivotal movement with the movable printed board so as to open and close the opening in response to pivoting of the movable printed board.

6. A shutter for a camera according to claim 1; wherein the fixed printed board comprises a disk-shaped printed circuit board having the coil patterns printed thereon and an opening formed in a center thereof in alignment with the opening formed in the supporting plate.

7. A shutter for a camera according to claim 1; wherein the shutter base plate has an opening formed there through in alignment with the opening formed in the supporting plate.

8. A shutter for a camera according to claim 1; wherein the movable printed board comprises a disk-shaped printed circuit board having the coil patterns printed thereon and an opening formed in a center thereof in alignment with the opening formed in the supporting plate.

9. A shutter for a camera according to claim 1; wherein the shutter base plate, the fixed printed board and the movable printed board have openings formed therein in alignment with the opening formed in the supporting plate.

10. A shutter for a camera according to claim 1; wherein the biasing member comprises a spring.

11. A shutter for a camera according to claim 2; wherein the end face cams comprise projections having surfaces inclining downward in a direction of forward pivotal movement of the sector member, so that when a repulsive magnetic force is produced between the coils of the movable printed board and the fixed printed board in the optical axis direction, the cam mechanism produces a force component in a pivotal direction of the movable printed board to cause the movable printed board to pivot against the biasing force of the biasing member.

12. A shutter for a camera, comprising: a shutter base plate; a movable plate pivotably supported by the shutter base plate and having magnetic field generating elements disposed thereon; one or more sector members engaged to the movable plate to undergo pivotal movement therewith for opening and closing a shutter aperture of the camera; a fixed plate confronting the movable plate and having one or more magnetic field generating elements disposed thereon confronting the magnetic field generating elements disposed on the movable plate, the magnetic field generating elements formed on at least one of the movable plate and the fixed plate comprising electromagnets for generating a magnetic field in response to a current passing therethrough; and a drive circuit for selectively supplying a current to the electromagnets to produce a repulsive or attractive magnetic field between the respective magnetic field generating elements to cause the movable plate to pivot with respect to the fixed plate to open and close the sector members.

13. A shutter for a camera according to claim 12; wherein the movable plate comprises a disk-shaped printed circuit board having an opening in a center thereof in alignment with the shutter aperture of the camera, and having a plurality of coil patterns printed thereon in a concentric arrangement relative to the opening formed therein.

14. A shutter for a camera according to claim 13; wherein the fixed plate comprises a disk-shaped printed circuit board having an opening in a center thereof in alignment with the shutter aperture of the camera, and having a plurality of coil patterns printed thereon in a concentric arrangement relative to the opening formed therein.

15. A shutter for a camera according to claim 13; wherein the magnetic field generating elements disposed on the fixed plate comprise a plurality of permanent magnets.

16. A shutter for a camera according to claim 13; further comprising a biasing member for biasing the movable plate so that the coil patterns disposed thereon are deviated by a predetermined angle from the magnetic field generating elements disposed on the fixed plate.

17. A shutter for a camera according to claim 13; further comprising a cam mechanism provided on the movable plate and the shutter base plate to enable the movable printed circuit board to pivot in forward and rearward directions.

18. A shutter for a camera according to claim 17; wherein the cam mechanism comprises end face cams arranged concentrically relative to the center of the opening of the shutter base plate and disposed on a surface of one of the shutter base plate and the movable plate, and cam followers projecting from the other one of the shutter base plate and the movable printed board.

19. A shutter for a camera according to claim 18; wherein the end face cams have surfaces inclining downward in an opening direction of the sector members, so that when a repulsive force is produced between the coils of the movable board and the fixed board in the optical axis direction, the cam mechanism produces a mechanical force component in a rotational direction of the movable printed board to cause the movable printed board to pivot.

20. A shutter for a camera according to claim 13; wherein the drive circuit supplies current to the coil patterns in a first direction to open the sector member when starting to drive the shutter and supplies current to the coil patterns in a reverse direction to close the sector members when closing the shutter.

* * * * *